US010686965B2

(12) United States Patent
Nakajima

(10) Patent No.: US 10,686,965 B2
(45) Date of Patent: Jun. 16, 2020

(54) MULTI-USER SCANNING SYSTEM WITH USER AUTHENTICATION

(71) Applicant: SEIKO EPSON CORPORATION, Tokyo (JP)

(72) Inventor: Yuji Nakajima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/799,441

(22) Filed: Oct. 31, 2017

(65) Prior Publication Data

US 2018/0131839 A1    May 10, 2018

(30) Foreign Application Priority Data

Nov. 4, 2016  (JP) ................................. 2016-215876

(51) Int. Cl.
*H04N 1/00* (2006.01)
*H04N 1/44* (2006.01)
*G06F 21/31* (2013.01)

(52) U.S. Cl.
CPC ........... *H04N 1/4433* (2013.01); *G06F 21/31* (2013.01); *H04N 1/00225* (2013.01);
(Continued)

(58) Field of Classification Search
CPC ............... H04N 1/4433; H04N 1/4426; H04N 1/00344; H04N 1/00241; H04N 1/4406;
(Continued)

(56) References Cited

U.S. PATENT DOCUMENTS 8,701,206 B2 * 4/2014 Yamada ............. H04N 1/00411
726/16
2009/0002744 A1 * 1/2009 Shimada ............ H04N 1/00204
358/1.15
(Continued)

FOREIGN PATENT DOCUMENTS

CN       102857660 A     1/2013
CN       103220448 A     7/2013
(Continued)

OTHER PUBLICATIONS

European Search Report issued in EP 17200005 dated Feb. 26, 2018.

*Primary Examiner* — Kent Yip
(74) *Attorney, Agent, or Firm* — Workman Nydegger

(57) ABSTRACT

Provided is technology that improves user convenience. A scanning system includes a scanner that generates scanning data by scanning a document, and a management device that connects to the scanner, and processes the scanning data based on settings corresponding to a user authenticated by a first user authentication when the scanner executes a first user authentication process. The scanning system executes a first process of scanning a document without first user authentication by the scanner, and storing the generated scanning data in storage; a second process of, when second user authentication is executed, identifying the scanning data to process from the scanning data stored in the storage; and a third process of processing the scanning data to process based on settings related to the user authenticated by the second user authentication.

12 Claims, 12 Drawing Sheets

(52) U.S. Cl.
CPC ..... *H04N 1/00241* (2013.01); *H04N 1/00344* (2013.01); *H04N 1/4406* (2013.01); *H04N 1/4426* (2013.01); *H04N 2201/0094* (2013.01)

(58) Field of Classification Search
CPC ........ H04N 1/00225; H04N 2201/0094; G06F 21/31
See application file for complete search history.

(56) References Cited

U.S. PATENT DOCUMENTS

| | | |
|---|---|---|
| 2009/0116052 A1 | 5/2009 | Matsuzawa |
| 2011/0149352 A1* | 6/2011 | Ding ................. H04N 1/00214 358/474 |
| 2013/0003148 A1 | 1/2013 | Kani et al. |
| 2013/0188212 A1 | 7/2013 | Pradhan et al. |
| 2015/0081702 A1* | 3/2015 | Kato .................. H04L 67/1097 707/736 |

FOREIGN PATENT DOCUMENTS

| | | |
|---|---|---|
| EP | 2570916 A2 | 3/2013 |
| JP | 2009-118082 | 5/2009 |
| JP | 2011004141 A | 1/2011 |

* cited by examiner

MULTI-USER SCANNING SYSTEM WITH USER AUTHENTICATION

BACKGROUND

1. Technical Field

The present invention relates to a scanning system, management device, computer-readable recording medium, and reading device.

2. Related Art

Systems that connect a scanner (which may be part of a multifunction device) to a network to share the scanner with multiple users are commonly in office environments. Some such systems require the user to go to the scanner for user authentication before the individual user is allowed to scan.

JP-A-2009-118082 describes a system that, when scanning is interrupted, enables resuming scanning using the settings that were made before scanning was interrupted.

A problem with such systems is that if the user goes to the scanner without the identification (ID) card required for user authentication, the user cannot be authenticated and cannot use the scanner.

SUMMARY

The present invention provides technology that can improve user convenience.

To achieve the foregoing objective, one aspect of the invention is a scanning system including a scanner that generates scanning data by scanning a document, and a management device that connects to the scanner, and processes the scanning data based on settings corresponding to a user authenticated by a first user authentication when the scanner executes a first user authentication process. The scanning system executes a first process of scanning a document without first user authentication by the scanner, and storing the generated scanning data in storage; a second process of, when second user authentication is executed, identifying the scanning data to process from the scanning data stored in the storage; and a third process of processing the scanning data to process based on settings related to the user authenticated by the second user authentication.

Another aspect of the invention is a management device that connects to a scanner configured to generate scanning data by reading a document, and acquires the scanning data from the scanner when a first user authentication is executed by the scanner, the management device executing: a process of receiving from the scanner and storing in the storage the generated scanning data when a document is scanned by the scanner without the first user authentication; a process of identifying target scanning data to process that is stored in the storage when second user authentication is executed; and a process of processing the target scanning data based on the settings related to the user authenticated by the second user authentication.

Another aspect of the invention is a control program of a management device that connects to a scanner configured to generate scanning data by reading a document, and acquires the scanning data from the scanner when a first user authentication is executed by the scanner, the control program causing a computer to implement functions of: receiving from the scanner and storing in storage the generated scanning data when a document is scanned by the scanner without the first user authentication, identifying target scanning data to process that is stored in the storage when second user authentication is executed, and processing the target scanning data based on the settings related to the user authenticated by the second user authentication.

Another aspect of the invention is a scanner that connects to a management device, generates scanning data by scanning a document when a first user authentication is executed, processing the scanning data according to settings related to the user that was authenticated by the first user authentication, and sending the scanning data to the management device, the scanner executing: a process of scanning a document without executing the first user authentication, and storing the generated scanning data in storage; and when a second user authentication is performed and output of the identified target scanning data stored in the storage is requested from the management device, a process of processing and sending the target scanning data to the management device according to settings related to the user authenticated by the second user authentication.

The embodiments described above provide technology that can improve user convenience.

Other objects and attainments together with a fuller understanding of the invention will become apparent and appreciated by referring to the following description and claims taken in conjunction with the accompanying drawings.

DESCRIPTION OF EMBODIMENTS

Figure 1:
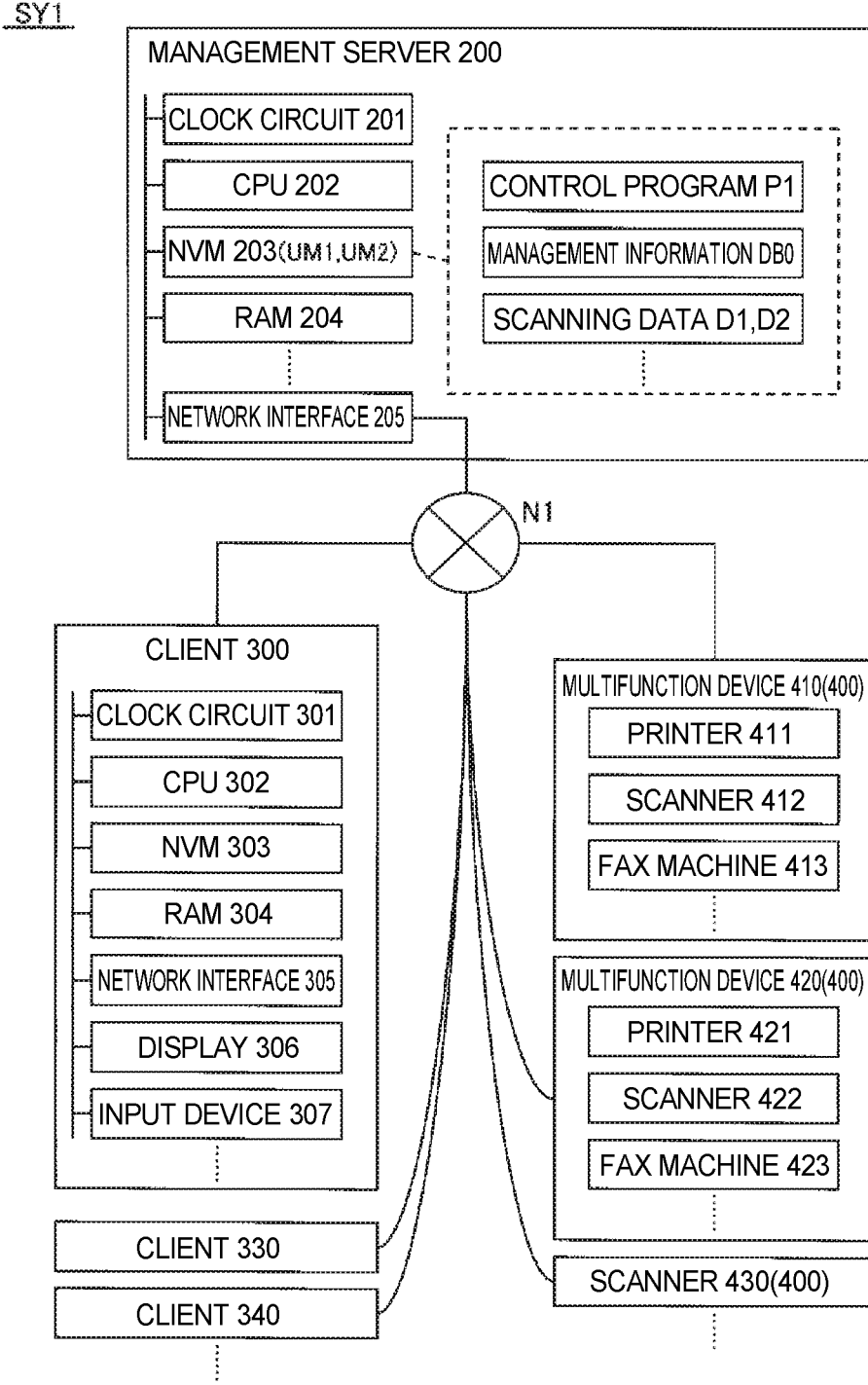
FIG. 1 is a block diagram illustrating the basic configuration of a scanning system.

A preferred embodiment of the present invention is described below with reference to the accompanying figures. The following embodiment shows only one example of the invention, and all features shown in the following embodiments are not essential to the solution provided by the invention.

(1) SUMMARY OF TECHNOLOGY INCLUDED IN THE INVENTION

Technology included in the invention is summarized below with reference to FIG. 1 to FIG. 12. Note that the figures referenced below schematically illustrate the invention, and are not coordinated for consistency with each other. Elements in this technology are also not limited to the specific examples indicated by reference numerals.

Embodiment 1

A scanning system SY1 according to the invention includes a scanner 400 for generating scanning data D1 by scanning a document D0, and a management device (such as a management server 200) that connects to the scanner 400, and when a first user is authenticated on the scanner 400, processes the scanning data D1 according to settings (such as job DB2) corresponding to the user authenticated by the first user authentication.

The scanning system SY1 executes a first process, second process, and third process as described below.

1. First Process

Figure 6:
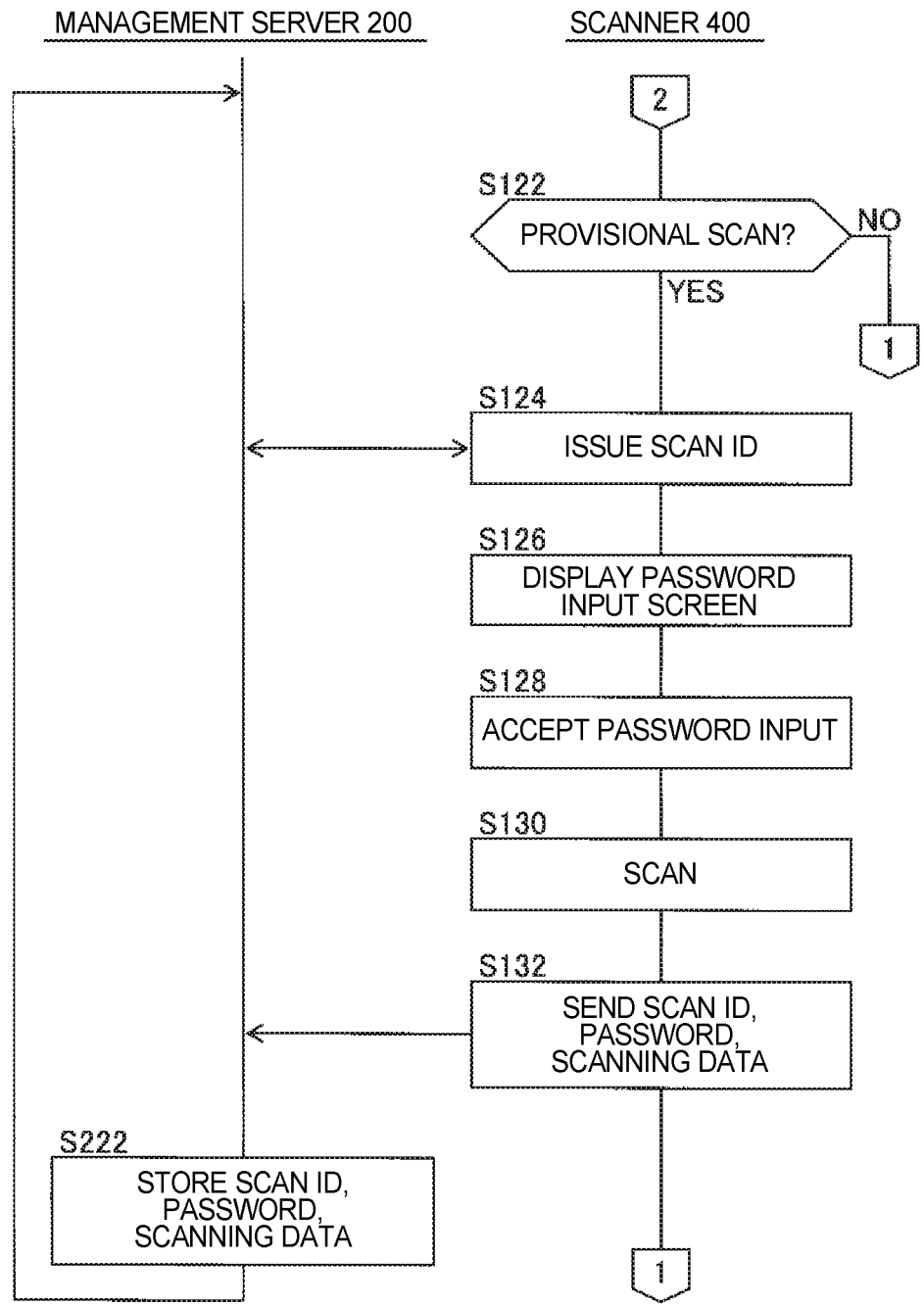
FIG. 6 is a flow chart of a provisional scanning process executed by a management device and a scanner.

In this process, the scanner 400 scans a document D0 without executing the first user authentication, and stores the scanning data D2 that is generated in storage UM1 (see the process shown in FIG. 6).

2. Second Process

Figure 8:
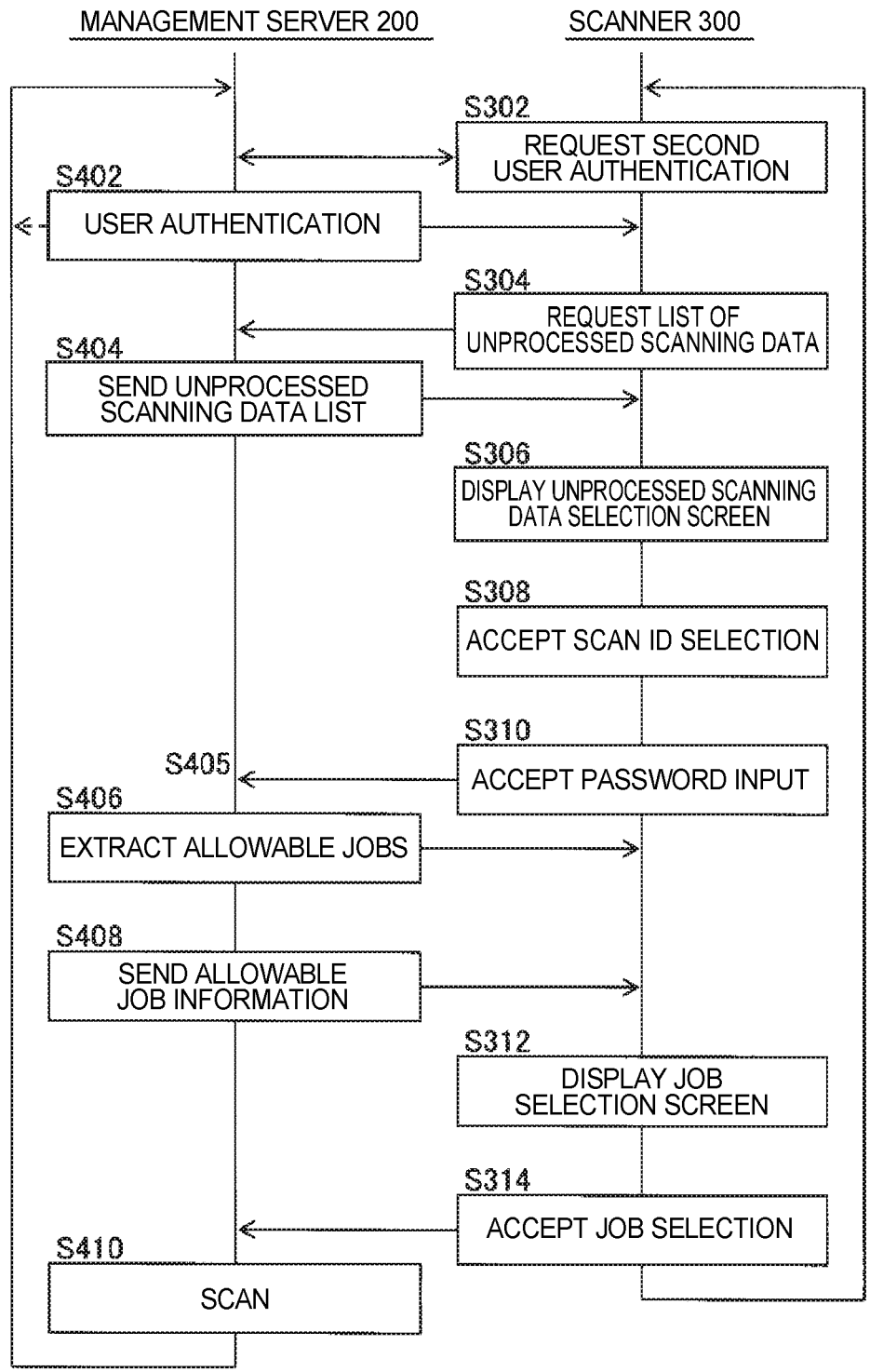
FIG. 8 is a flow chart of an authentication data process executed by the management device and client.

The second process identifies scanning data D3 that is stored in storage UM1 for processing when a second user authentication is performed (the process shown in FIG. 8, steps S302-S310, and S402-S405).

3. Third Process

The third process processes the scanning data D3 to process according to the settings (DB2) corresponding to the user authenticated by the second user authentication (the process shown in FIG. 8, steps S406-S410, and S312-S314).

In the first embodiment, the scanning data D2 is processed according to the settings (DB2) corresponding to the user using the scanner 400 without authenticating the user at the scanner 400. The first embodiment thus provides a scanning system that improves user convenience.

Note that a scanner as referred to as herein includes both single-function scanners and multifunction devices having a scanner function.

Embodiment 2

Figure 5:
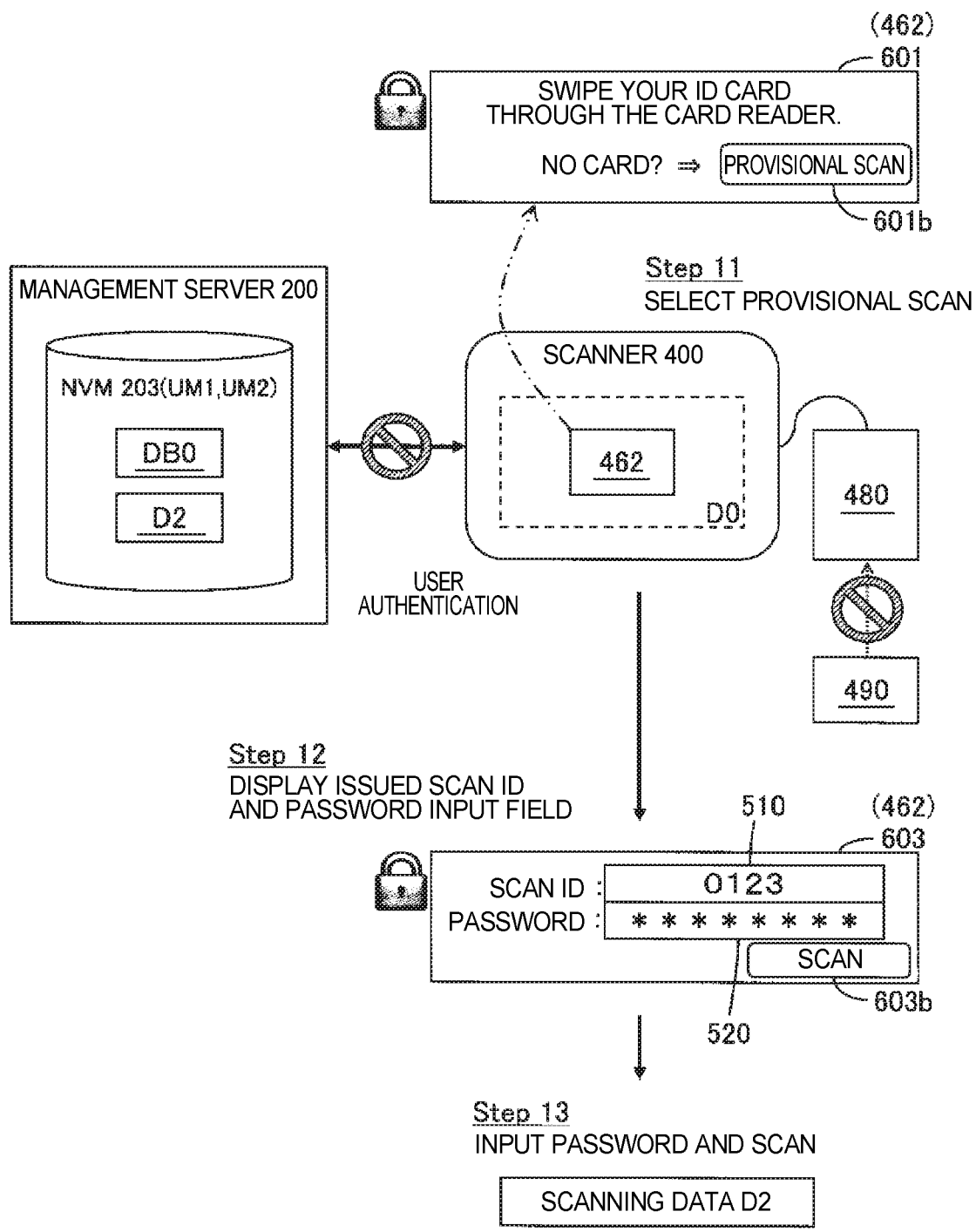
FIG. 5 illustrates scanning without user authentication.
Figure 7:
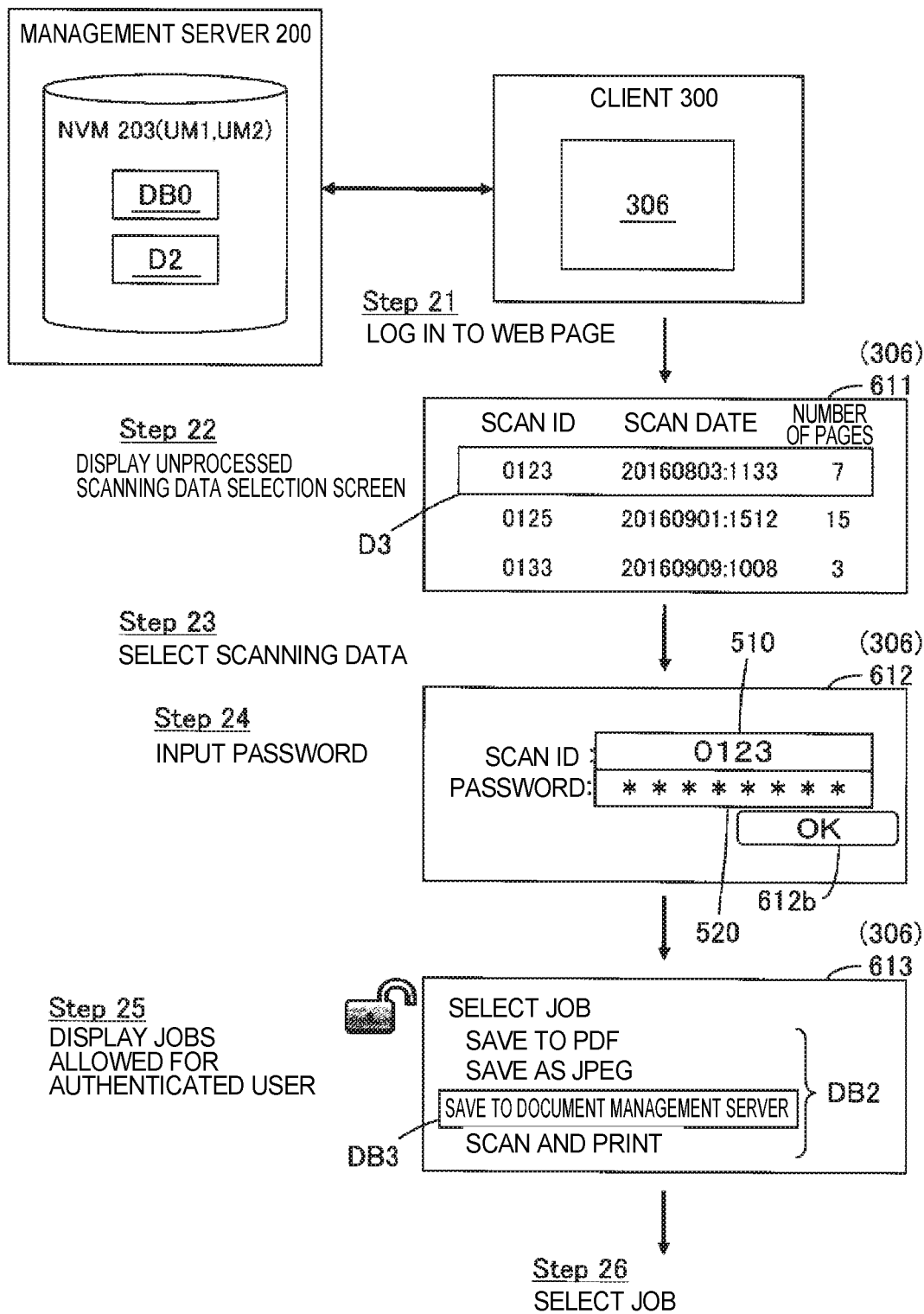
FIG. 7 illustrates processing scanning data after a second user authentication.

As shown in FIG. 5 and FIG. 7, the management device (200) may have the storage UM1. The scanner 400 reads a document D0 without executing the first user authentication, and sends the scanning data D2 that is generated to the management device (200). When scanning data D2 is received without completing the first user authentication, the management device (200) may store the scanning data D2 in storage UM1. When the second user authentication is performed, the management device (200) may execute the second process that identifies the scanning data D3 stored in storage UM1 for processing. In addition, the management device (200) may also execute the third process that processes the scanning data D3 to be processed according to the settings (DB2) corresponding to the user authenticated by the second user authentication.

In this embodiment, the scanner 400 requires less storage capacity, and provides a desirable scanning system that improves user convenience.

Note that the invention includes configurations in which the scanner has its own storage, and configuration in which the storage is connected to the network.

Embodiment 3

As shown in FIG. 5, identification information (such as a scan ID 510) identifying particular scanning data D2 that was generated without executing the first user authentication may also be output in the first process. As shown in FIG. 7, in the second process, when the second user authentication is completed and identification information (510) is selected, the scanning data D3 identified by the identification information (510) is selected from the scanning data D2 stored in the storage UM1 as the object to process. This configuration provides a desirable example enabling a user that temporarily stored scanning data to process the scanning data.

Embodiment 4

As shown in FIG. 5, the first process may also be configured to output identification information (510) and accept input setting a password 520. As shown in FIG. 7, in the second process, when identification information (510) is selected and a password 520 is input, the scanning data D3 identified by the identification information (510) can be selected from the scanning data D2 stored in the storage UM1 as the object to process. This configuration provides a desirable example enabling a user that temporarily stored scanning data to process the scanning data.

Embodiment 5

As shown in FIG. 7, in the third process, a setting (such as job DB3) setting the process to apply to the target scanning data D3 is selected from among the one or more settings (DB2) allowed for the user authenticated by the second user authentication, and processes the target scanning data D3 according to the selected settings (DB3). This configuration enables specifying the settings (DB3) to use to process the target scanning data D3, and further improves user convenience.

Embodiment 6

In the third process, the target scanning data D3 may be output to the destination (address) corresponding to the user authenticated by the second user authentication. This configuration provides a scanning system that desirably improves user convenience.

Embodiment 7

As shown in FIG. 7, a process of converting the target scanning data D3 to the output data format included in the settings (DB2) corresponding to the user authenticated by the second user authentication may be executed in the third process. By converting the target scanning data D3 to the output data format set for the user, this configuration provides a scanning system that desirably improves user convenience.

Embodiment 8

Figure 9:
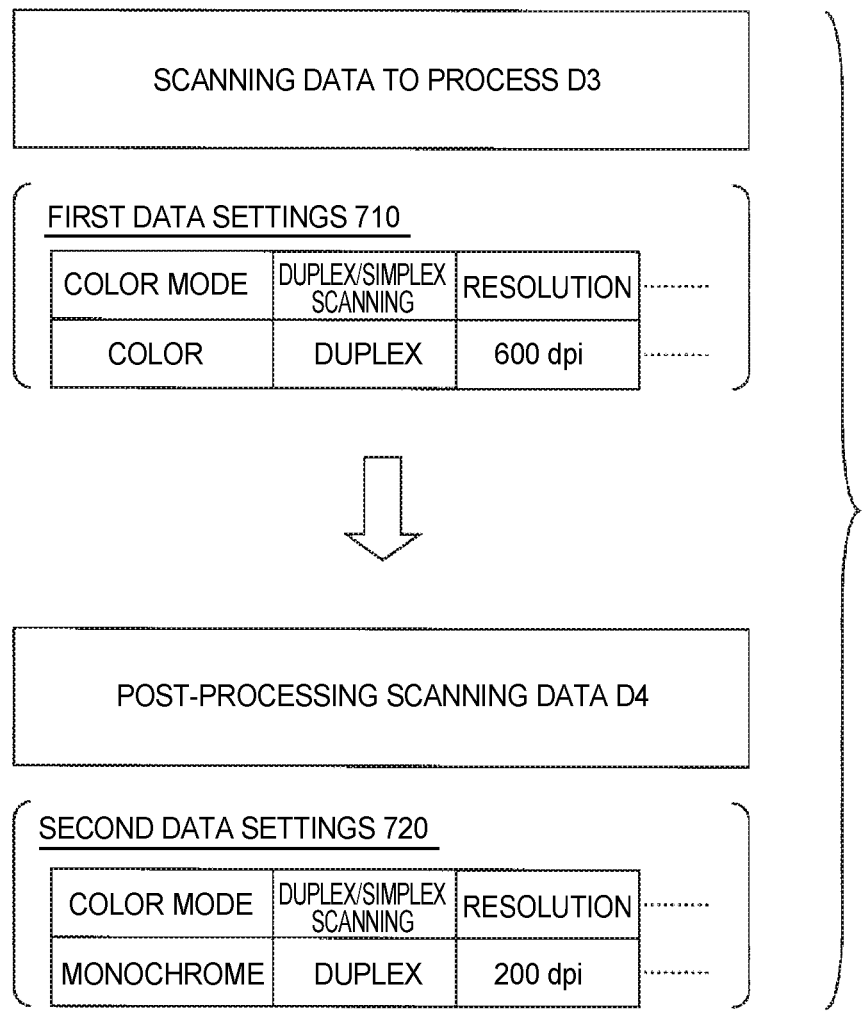
FIG. 9 illustrates converting scanning data for processing to second data settings.

As shown in FIG. 9, in the first process, a document D0 is scanned according to first data settings 710 without executing the first user authentication on the scanner 400, and the scanning data D2 that is generated is stored in storage UM1.

The third process may include a process of converting the target scanning data D3 generated according to the first data settings 710 to second data settings 720 based on second data settings 720 corresponding to the user authenticated by the second user authentication. Because the target scanning data D3 is converted to second data settings 720 corresponding to the user, this configuration provides a scanning system that desirably improves user convenience.

Note that leaving the target scanning data conforming to the first data settings when the first data settings and second data settings are the same is also included in this example.

Embodiment 9

As shown in FIG. 9, the functions of the first data settings 710 may supersede the functions of the second data settings 720. This configuration can easily convert the scanning data object to process to the second data settings corresponding to the user.

The functions of the first data settings 710 superseding the function of the second data settings include the first data settings being more advanced than the second data settings, and the functions of the first data settings being the same as the functions of the second data settings.

For example, when the data setting is a color mode specifying color or monochrome, the color mode is more advanced than the monochrome mode. Therefore, if the first data setting is for color, the functionality of the first data setting is more advanced than the functionality of the second data setting whether the second data setting is set to color or monochrome.

Likewise, if the data setting specifies double-sided or single-sided scanning, double-sided scanning is more advanced than single-sided scanning. Therefore, if the first data setting is for double-sided scanning, the functionality of the first data setting is more advanced than the functionality of the second data setting whether the second data setting is set to double-sided or single-sided scanning.

Furthermore, if the data setting specifies the scanning resolution, and the first data setting is for high resolution scanning (such as 600 dpi), the functionality of the first data setting is more advanced than the functionality of the second data setting regardless of the resolution setting of the second data setting.

Embodiment 10

Figure 10:
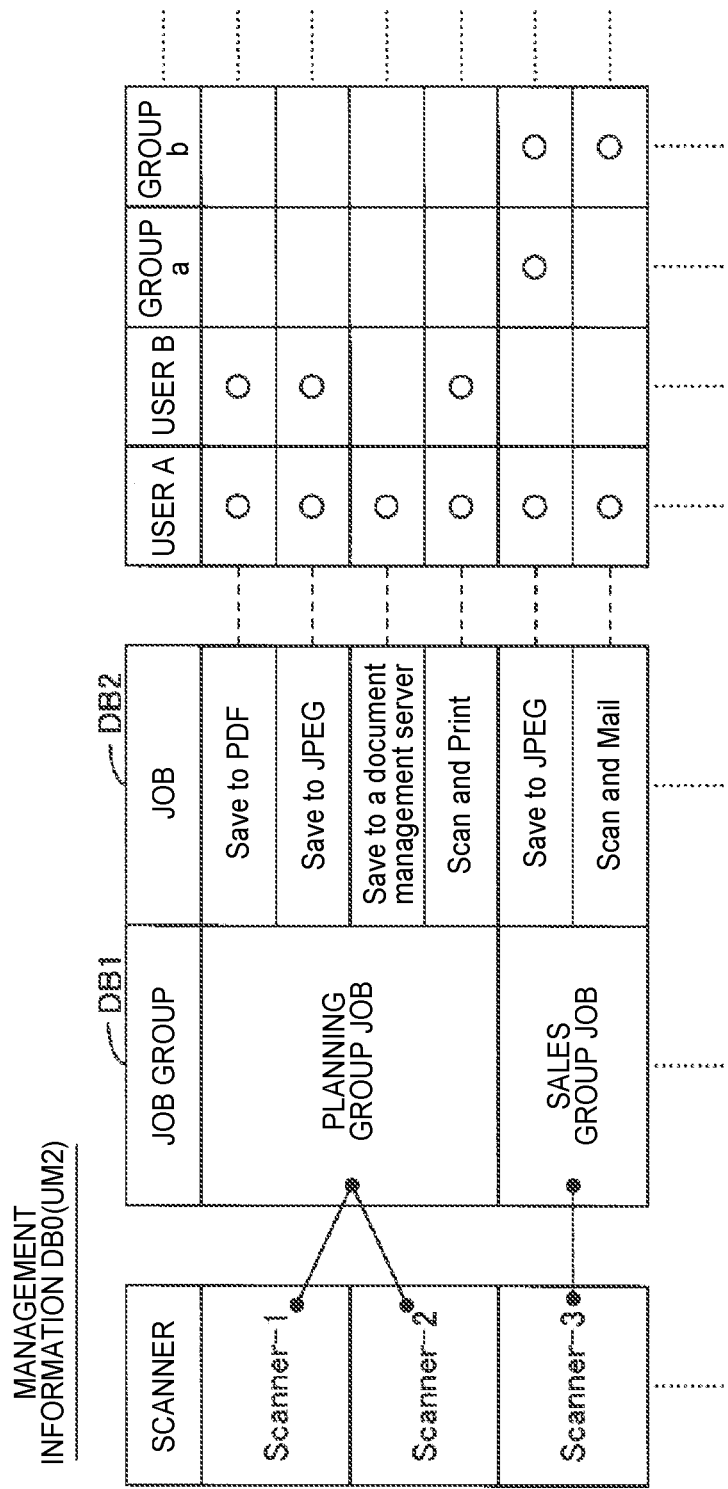
FIG. 10 shows an example of management information.

As shown in FIG. 10, there may also be management information storage UM2 that stores management information DB0 for managing the settings allowed for users. In the management information DB0, one or more settings selected from multiple settings (DB2) for managing the scanning data D1, D2 are combined in job groups DB1. One or more job groups DB1 may be defined. A scanner selected from among one or more scanners 400, and job groups selected from the one or more job groups DB1, are relationally stored in the management information DB0. One or more users may also be linked to individual settings (DB2) belonging to a job group DB1 in the management information DB0. In the third process, settings allowed by the scanner 400 for the user authenticated by the second user authentication may be extracted based on the management information DB0, and the target scanning data D3 may be managed according to the extracted settings.

For example, when office personnel are reorganized, the management information DB0 can be maintained by editing the job groups DB1 linked to specific scanners 400. As a result, the first embodiment described above can provide a scanning system in which management information can be easily maintained.

Furthermore, only one job group may be linked to a particular scanner, or two or more job groups may be linked to a scanner. In addition, only one scanner may be linked to a particular job group, or two or more scanners may be linked to a job group.

One or more user groups of one or more users linked to individual settings is also included in one or more users being linked to individual settings in a job group.

Embodiment 11

In one aspect of the invention the management device (200) acquires scanning data D1 from the scanner 400 when a scanner 400 that generates scanning data D1 by reading a document D0 is connected and a first user authentication is completed on the scanner 400.

The scanner 400 executes a first process, second process, and third process as described below.

1. First Process

When the scanner 400 scans a document D0 without executing the first user authentication, the scanning data D2 that is generated is received from the scanner 400 and stored in storage UM1 (see step S222 in FIG. 6).

2. Second Process

When a second user authentication is performed, the second process identifies scanning data D3 that is stored in storage UM1 to be processed (the process shown in FIG. 8, steps S402-S405).

3. Third Process

The third process processes the scanning data D3 to process according to the settings (DB2) corresponding to the user authenticated by the second user authentication (the process shown in FIG. 8, steps S406-S410).

In embodiment 11, even if user authentication is not possible at the scanner 400, scanning data D2 is processed using the scanner 400 according to the settings (DB2) appropriate to the user. This embodiment can therefore provide a management device that can improve user convenience.

Embodiment 12

In this embodiment, the control program P1 of the management device (200) according to one aspect of the invention causes a computer to execute a first function corresponding to the first process of the management device (200), a second function corresponding to the second process of the management device (200), and a third function corresponding to the third process of the management device (200). This embodiment provides a control program of a management device that can improve user convenience.

Embodiment 13

Figure 11:
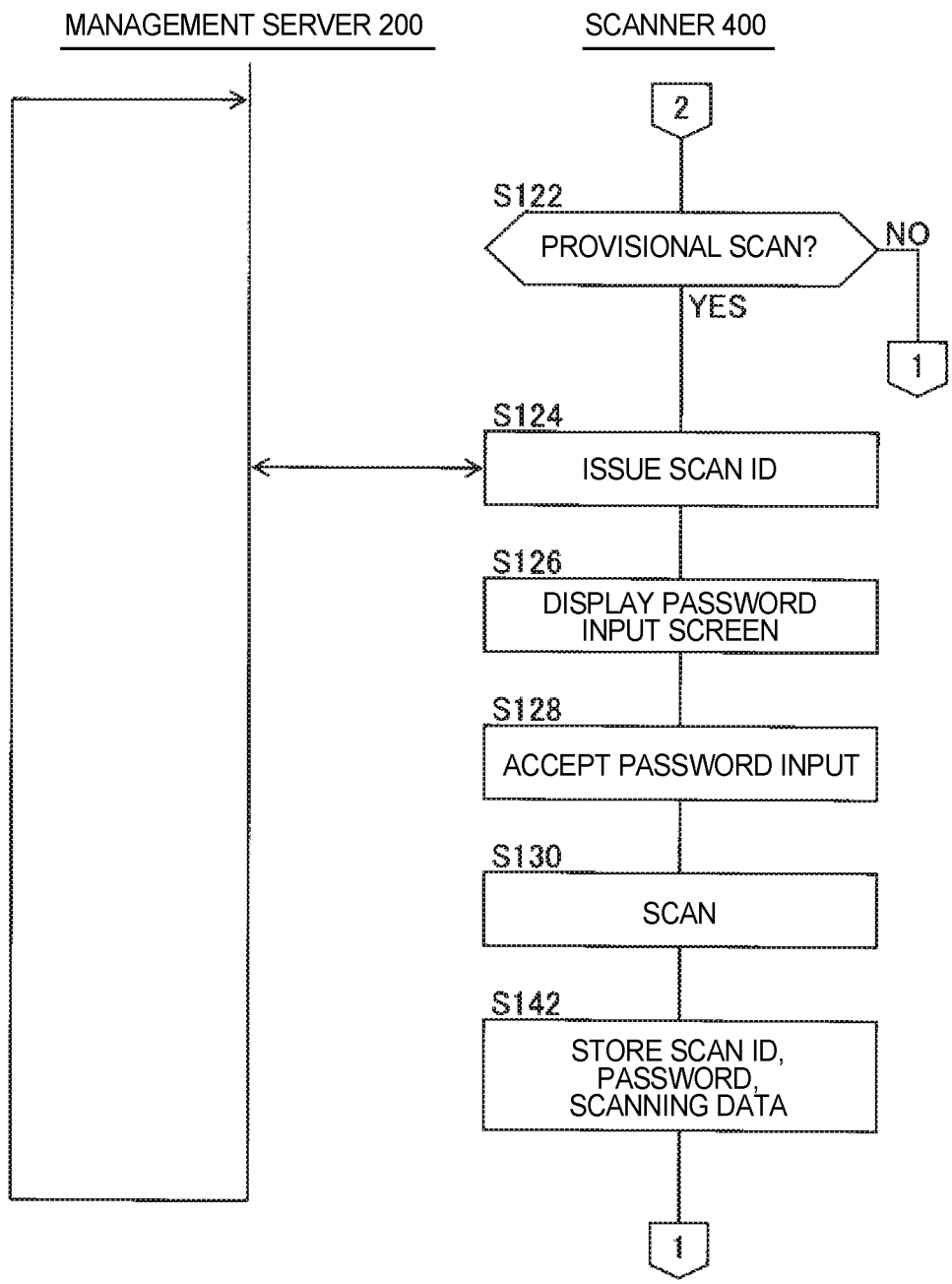
FIG. 11 is a flow chart of a provisional scanning process executed by the scanner.
Figure 12:
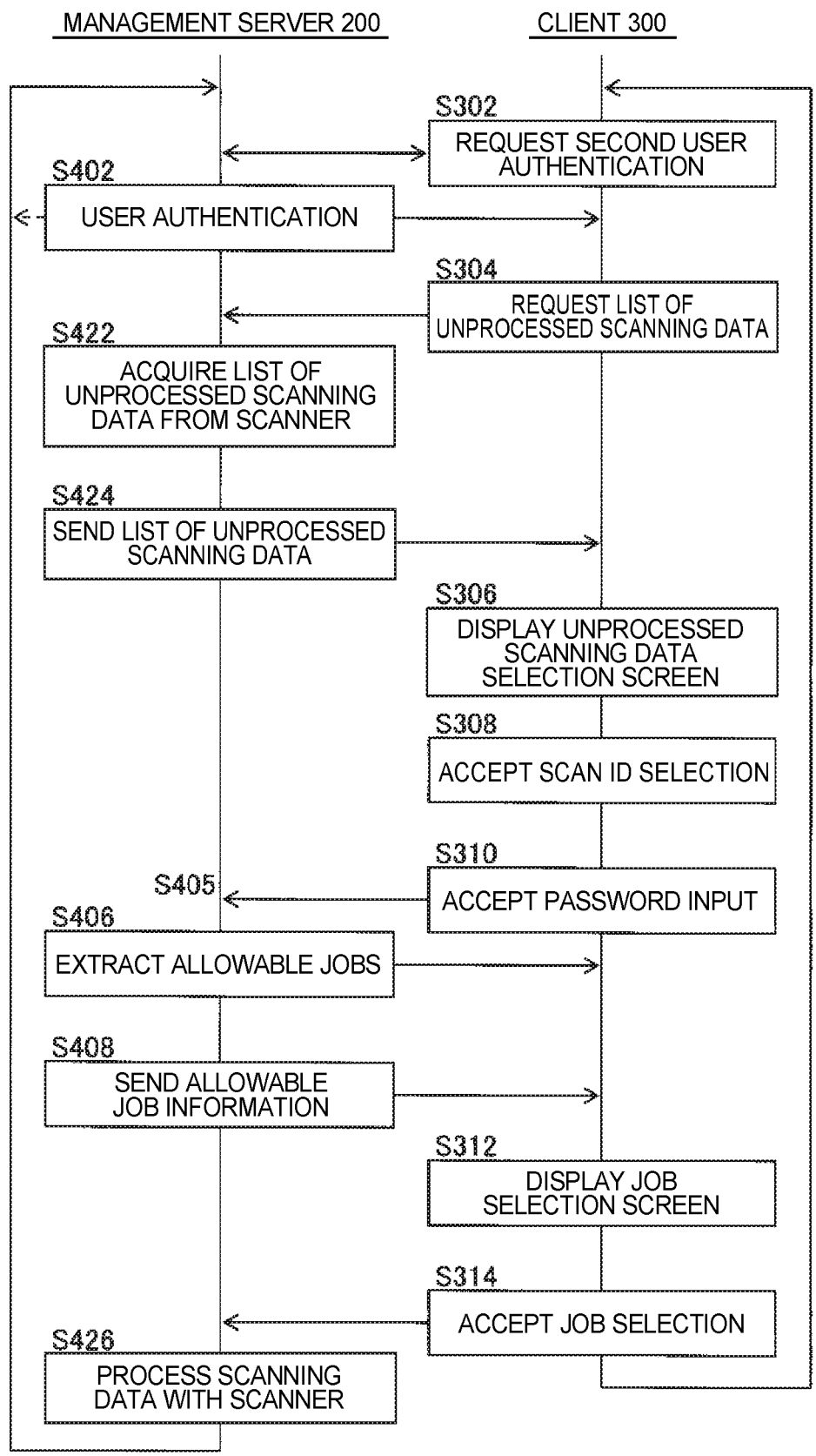
FIG. 12 is a flow chart of another example of an authentication data process executed by the management device and client.

As shown in FIG. 11 and FIG. 12, when a scanner 400 according to this embodiment is connected to the management device (200) and the first user authentication is executed, scanning data D1 is generated by scanning a document D0, the scanning data D1 is processed according to the settings (DB2) for the user that was authenticated by the first user authentication, and is sent to the management device (200). The scanner 400 executes the following processes.

1. First Process

When a document D0 is scanned without executing the first user authentication, the scanning data D2 that is generated is stored in storage UM1.

2. Second Process

When the second user authentication is performed, and output of the identified scanning data D3 object stored in the storage UM1 is requested by the management device (200), the target scanning data D3 is processed according to the settings (DB2) appropriate to the user authenticated by the second user authentication, and is sent to the management device (200).

In embodiment 13, even if user authentication is not possible at the scanner 400, scanning data D2 is processed using the scanner 400 according to the settings (DB2) appropriate to the user. This embodiment can therefore provide a scanner that can improve user convenience.

The technology of the invention can also be expressed as a control method of a scanning system, a control method of a management device, a control method of a scanner, a control program of a scanning system, a control program of a scanner, and a computer-readable medium recording one of the control programs. The foregoing devices may also be configured by multiple discrete parts.

(2) SPECIFIC CONFIGURATION IF A SCANNING SYSTEM

FIG. 1 illustrates a scanning system that executes an authenticated scanning process. The scanning system SY1 shown in FIG. 1 includes a management server 200 (an example of a management device) embodied by a server computer, clients 300, 330, 340 as client computers, and scanners (410, 420, 430). Note that the multifunction devices 410, 420, and single-function scanner 430, are collectively referred to as simply scanner 400 below.

In FIG. 1, management server 200, clients 300, 330, 340, and scanners 400 are connected to a network N1, and can exchange information with each other.

The network N1 may be the Internet, a LAN (Local Area Network), or a network connecting multiple LANs through a WAN (Wide Area Network), or a wireless network including a wireless LAN. The number of clients in the scanning system is not specifically limited, and there may be only one. The number of scanners in the scanning system is also not specifically limited, and there may be only one. There may be two or more single-function devices in the scanning system, or single-function devices may not be included in the scanning system. The management server 200 may also comprise multiple discrete computers.

The management server 200 shown in FIG. 1 includes a clock circuit 201, CPU (central processing unit) 202, nonvolatile memory 203, RAM (random access memory) 204, network interface 205, display device not shown, and input device(s) not shown (such as a pointing device or keyboard). Components 201-205 are connected to and can exchange data with each other. NVM 203 stores a control program P1 rendered in RAM 204, and management information DB0 for managing jobs (an example of settings) allowed for users. The NVM 203 storing management information DB0 is an example of management information storage UM2. The NVM 203 also stores scanning data D1, D2 generated by scanning a document. NVM 203 storing provisional scanning data D2 generated without user authentication is an example of storage UM1. The NVM 203 may be ROM (read-only memory), flash memory, or other nonvolatile semiconductor memory, or a hard disk drive or other magnetic recording medium, for example. The network interface 205 is connected to the network N1, and handles data communication with external devices (for example, clients 300, 330, 340, and scanner 400) connected to the network.

Note that the management server 200 may be embodied by multiple communicatively-connected discrete devices.

The client 300 shown in FIG. 1 has a clock circuit 301, CPU 302, NVM 303, RAM 304, network interface 305, display 306, and input device 307 (such as a pointing device or keyboard). Components 301-307 are connected to and can exchange data with each other. NVM 303 stores a control program rendered in RAM 304. ROM, nonvolatile memory semiconductor memory, magnetic recording medium, or other device may be used as NVM 303. The network interface 305 is connected to the network N1, and handles data communication with external devices connected to the network.

Note that the client 300 may be embodied by multiple communicatively-connected discrete devices. The configuration of clients 330, 340 is the same as client 300, and further description thereof is omitted.

The multifunction device 410 shown in FIG. 1 includes a printer 411, scanner 412, fax machine 413, and is connected to the network N1. Multifunction device 420 shown in FIG. 1 also comprises a printer 421, scanner 422, and fax machine 423, and is connected to the network N1. Another scanner 430 is also connected to the network N1.

Printers 411, 421 are devices for printing on copy paper or other type of print medium (print substrate). The printers 411, 421 form images corresponding to image data on the print substate by means of a color agent (such as ink or toner). The printers 411, 421 may be inkjet printers, laser printers or other electrophotographic printer, for example.

The scanners 412, 422, 430 are image scanners for reading (scanning) documents. The scanners 412, 422, 430 emit light from a light source to the document, capture a document image, and create an image of the document. The scanners 412, 422, 430 may be, for example, flatbed scanners in which the document is placed between a platen glass and a document cover, scanners with a document feeder, or other type of scanner.

The fax machines 413, 423 are connected to a telephone line not shown, and send and receive faxes with other fax machines connected to the telephone network.

Figure 2:
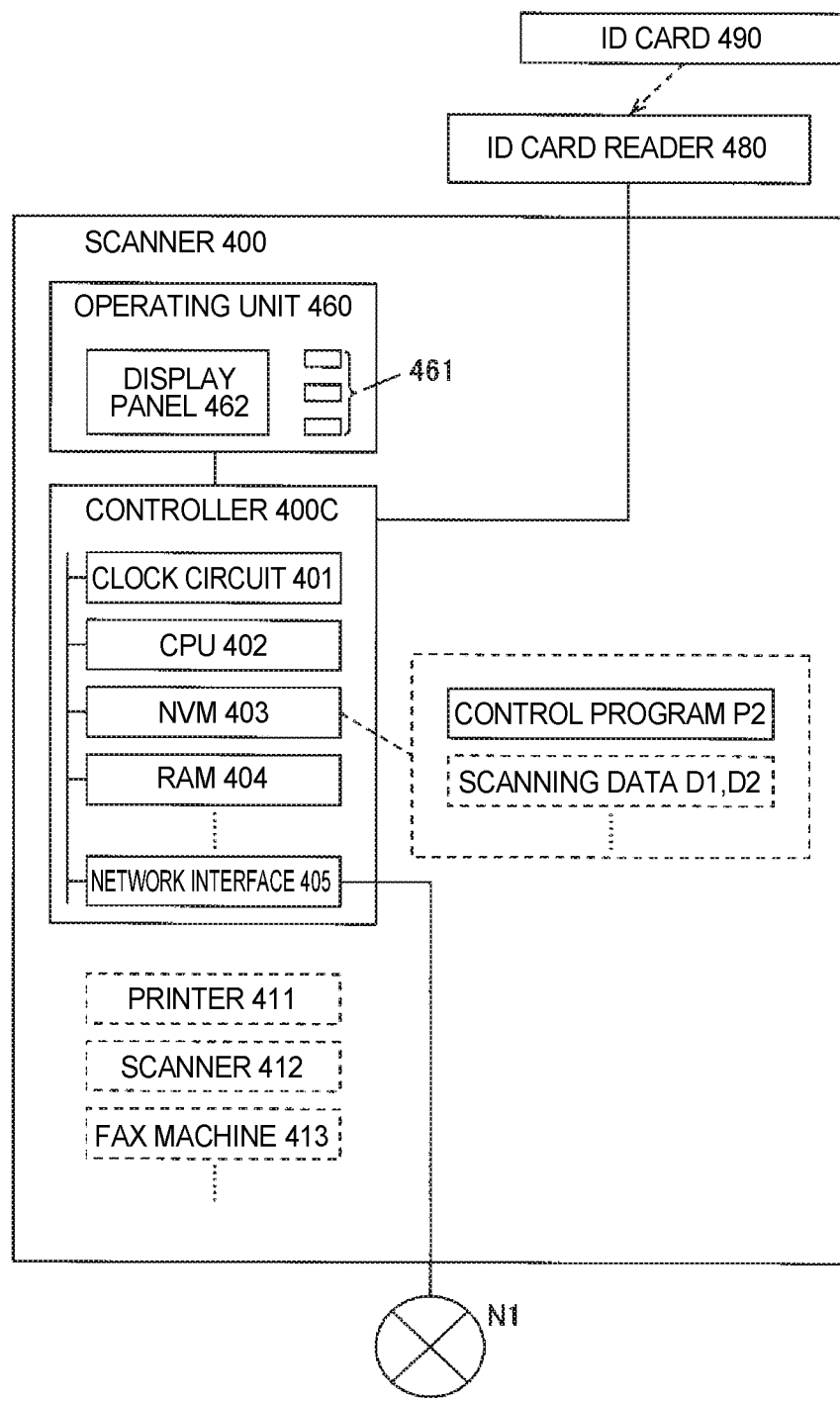
FIG. 2 is a block diagram illustrating the functional configuration of a scanner.

FIG. 2 primarily illustrates the configuration of the control system of the scanner. The controller 400c of the scanner 400 shown in FIG. 2 includes a clock circuit 401, CPU402, NVM 403, RAM 404, and network interface 405, and is connected to an operating unit 460, and externally connected ID (identification) card reader 480. Components 401-405 are connected to and can exchange data with each other. NVM 403 stores a control program P2 rendered in RAM 404. NVM 403 also stores scanning data D1, D2. The NVM 403 may be ROM (read-only memory), flash memory, or other nonvolatile semiconductor memory, or a magnetic recording medium, for example. The network interface 405 is connected to the network N1, and handles data communication with external devices connected to the network N1.

When the scanner 400 is a multifunction device 410, the controller 400c controls operation of the printer 411, scanner 412, and fax machine 413.

The operating unit 460 shown in FIG. 2 includes hardware keys 461, and a display panel 462 as a display unit. When operation of a key is detected, the hardware keys 461 output a detection signal indicating what key was pressed. The display panel 462 may be a LCD panel, for example, and displays information. If a touch panel is affixed to the surface of the display panel 462, the display panel 462 accepts operations when touched by a finger (or stylus, for example).

The ID card reader 480 shown ink nozzle face 2 is a device that reads information from an IC card or other ID card 490. Information identifying the user that uses the scanning system SY1 is stored on the ID card 490. When the ID card 490 is an IC card that generates current using the RF signals from the card reader, and has an IC tag that wirelessly transmits information identifying the user, the ID card reader 480 can acquire the information identifying the user by receiving the wireless signals from the IC tag through an internal antenna.

Processes executed by the scanning system SY1 are sequentially described below.

The management server 200, client 300, and scanner 400 execute multiple processes in parallel in a multitasking environment. The processes executed to embody the technology of the invention, including the processes shown in FIG. 4, FIG. 6, FIG. 8, FIG. 11, and FIG. 12, are not limited to be run by a CPU, and may be executed by other electronic components such as an ASIC (Application Specific Integrated Circuit). The processes executed to embody the technology of the invention may also be distributed processes executed by multiple CPUs, or executed by a CPU and other electronic parts (such as an ASIC) working together.

(3) EXAMPLE OF AN AUTHENTICATED SCANNING PROCESS BY FIRST USER AUTHENTICATION

Figure 3:
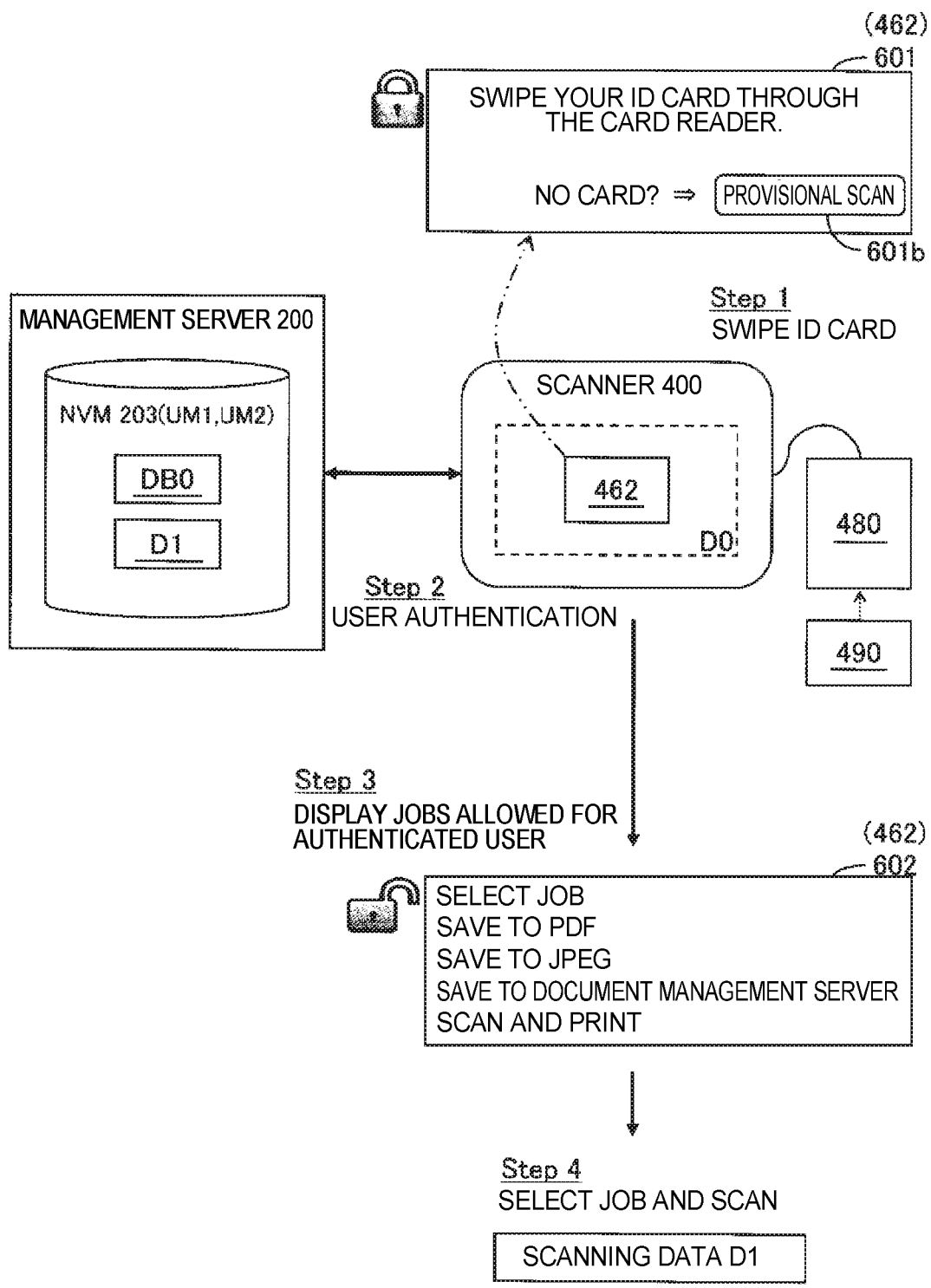
FIG. 3 illustrates scanning after a first user authentication.

FIG. 3 schematically illustrates scanning following a first user authentication. A default screen 601 prompting the user to swipe the ID card 490 through the ID card reader 480 is first displayed on the display panel 462 of the scanner 400. The default screen 601 also has a provisional scan button 601b used to scan temporarily when the user's ID card is not available (such as when the user forgot the ID card).

To scan a document using the scanning system SY1, the user must go to the scanner 400, and swipe the user's ID card 490 through the ID card reader 480 (step 1). As a result, the scanner 400 acquires the ID of the user from the ID card reader 480, and executes the first user authentication in conjunction with the management server 200 (step 2). In the first user authentication, the scanner 400, working with the management server 200, presents on the display panel 462 a job selection screen 602 enabling an authorized user to select one or more jobs that are allowed for that user (step 3). When the user uses the operating unit 460 and selects a job from the jobs in the job selection screen 602, the scanner 400 captures an image of the document D0 and generates scanning data D1 according to the selected job, and processes the scanning data D1 in conjunction with the management server 200 (step 4).

Figure 4:
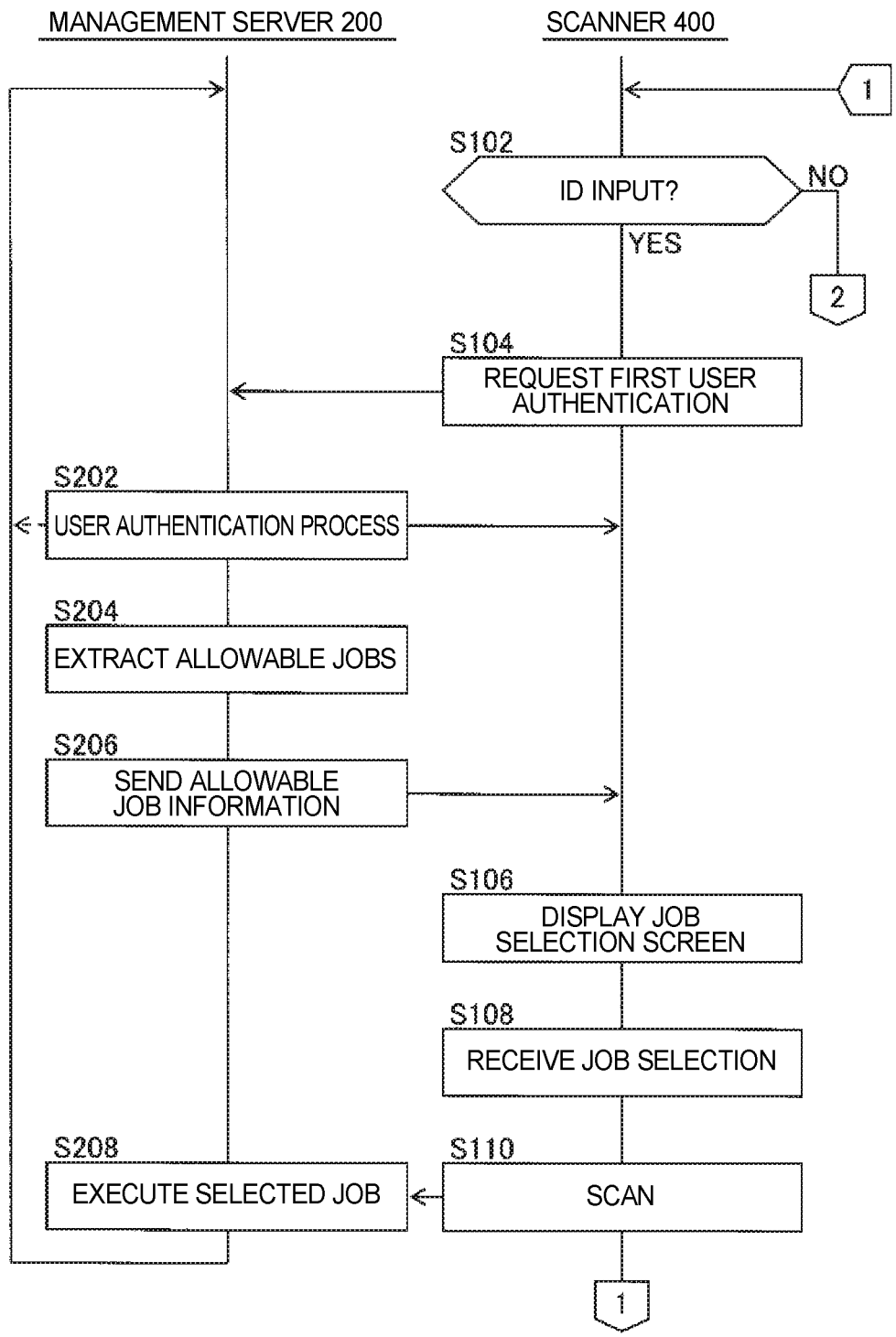
FIG. 4 is a flow chart of an authenticated scanning process executed by a management device and a scanner.

FIG. 4 is a flow chart of the authenticated scanning process executed to enable the authenticated scan shown in FIG. 3. This process is executed repeatedly by the scanner 400 and management server 200 working together. Note that arrows 1 indicate that the process returns to step S102, and arrows 2 indicate that the process goes to step S122. Note also that the word "step" is omitted in the figures and below.

The scanner 400 first determines if the ID from an ID card 490 was input from the ID card reader 480 (S102). When the user swipes the ID card 490 through the ID card reader 480, the ID read by the ID card reader 480 is input to the controller 400c. If an ID is not input, the scanner 400 goes to step S122 in FIG. 6 described below. If the ID is input, the scanner 400 requests the management server 200 to authenticate the user corresponding to the input ID (an example of first user authentication) (S104). The ID that was input is included in the request.

The management server 200 that receives the request executes a user authentication process that determines whether or not the ID included in the request is an ID of a user allowed by the scanning system SY1, and reports the result of this process to the scanner 400 (S202). If the ID in the request is not the ID of a permitted user, user authentication fails, and the management server 200 waits for a request from the scanner 400 without proceeding to S204.

If the ID in the request is the ID of a permitted user, user authentication succeeds, and the management server 200 extracts from the management information DB0 information expressing the one or more jobs allowed for the user corresponding to the ID (S204).

While described in further detail below, an example of the management information DB0 is shown in FIG. 10. In FIG. 10, a circle (○) indicates that job is allowed for the user. For example, if the scanner 400 is Scanner-1, and the user identified by the ID is user A, the allowed jobs are Save to PDF, Save to JPEG, Save to a document management server, and Scan and Print.

The data format in a Save to PDF job is PDF, and the data format in a Save to JPEG job is JPEG. The data format when saving to a document management server in this example is also PDF, and the data format in a Scan and Print job in this example is a page description language. The output destination for Save to PDF and Save to JPEG is a client device the user is allowed to use. The output destination for a Save to document management server job is a document management server not shown. The output destination for a Scan and Print job is Scanner-1 (the scanner that scanned the document), or a multifunction printer or printer connected to the network.

Different users may also be allowed to perform different jobs with the same scanner. For example, if the scanner is Scanner-1 but the user identified by the ID is user B, the jobs that are allowed include Save to PDF, Save to JPEG, and Scan and Print. These are examples of settings corresponding to permitted users.

Other settings that may be included in the allowable jobs include a color mode indicating whether to scan document images in color or monochrome, double/single-sided scanning for scanning both or only one side of the document, and the resolution used to scan a document image.

Furthermore, if the scanner 400 is Scanner-3, and the user identified by the ID is a user in User Group b, the allowed jobs are Save to PDF, and Scan and Mail. The address for a Scan and Mail job is the e-mail address assigned to the user.

After extracting the allowable jobs, the management server 200 sends information indicating the extracted allowable jobs to the scanner 400 (S206).

The scanner 400 receiving the information indicating the allowable jobs then displays a job selection screen 602 such as shown in FIG. 3 on the display panel 462 (S106). In the job selection screen 602 shown in FIG. 3 are the names of jobs, such as Save to PDF, Save to JPEG, Save to document management server, and Scan and Print. As described above, the destination of Save to PDF and Save to JPEG jobs is the client device the user is permitted to use; the destination of Save to document management server jobs is a document management server not shown; and the destination of Scan and Print jobs is Scanner-1 or a multifunction device or printer connected to the network.

After displaying the job selection screen 602, the scanner 400 receives the operation selecting a allowable job from the job selection screen 602 (S108). By operating the operating unit 460, the user performs the operation selecting a allowable job. Operations configuring data settings, such as setting the color mode, double/single-sided scanning, and the scanning resolution, can be accepted in the process of S108.

When an allowable job is selected, the scanner 400 generates the scanning data D1 by reading an image of the document D0 according to the default settings or settings received from the user (S110), sends information describing the allowable job that was selected, and the data settings, with the scanning data D1 to the management server 200, and requests processing the scanning data D1. The management server 200 that receives this request then processes the scanning data D1 according to the job settings included in the request (S208), and then again waits for a request from a scanner 400, for example.

For example, if a Save to PDF job request is received, the management server 200 converts and saves the scanning data D1 in PDF format (an example of a data format). If a Scan and Mail request is received, the management server 200 converts the scanning data D1 to an e-mail format (an example of a data format), and sends the e-mail to the specified e-mail address.

When a first user authentication is completed by the scanner 400, the management server 200 thus processes the scanning data D1 according to the settings corresponding to the user authenticated by the first user authentication. Of course, a process of outputting the scanning data D1 according to the destination related to the user authenticated by user authentication is also executed. A process of converting the scanning data D1 to the output data format included in the settings corresponding to the user authenticated by user authentication is also executed.

(4) SCANNING WITHOUT USER AUTHENTICATION

In this scanning system SY1, a user that does not have an ID card cannot be authenticated at (by) the scanner 400. In this event, while the user can return to the scanner 400 with the ID card and then be authenticated, this wastes the time required to go and get the ID card. The system administrator could also issue a temporary ID card, but this often takes some time. Inputting a user ID and password to the display panel 462 of the scanner 400 is also conceivable, but for security, the ID and login password are typically complicated strings. As a result, the user often does not remember the user ID and password, and inputting a long, complicated string to a small operating unit 460 can be difficult.

This example therefore enables provisionally scanning a document image with the scanner 400 when the user cannot be authenticated, and later processing the scanning data triggered by the user being later authenticated through a device other than the scanner 400.

FIG. 5 schematically illustrates scanning without user authentication. A default screen 601 with a provisional scan button 601b is displayed on the display panel 462 of the scanner 400. Because a user that forgot the user's ID card 490 cannot be authenticated at the scanner 400, the user first operates the provisional scan button 601b at the operating unit 460 (step 11). The scanner 400 then issues a scan ID 510 (an example of identification information) identifying the provisional scanning data D2 generated without first user authentication, and displays a password input screen 603 including the scan ID 510 on the display panel 462 (step 12).

The password input screen 603 includes an input field for the user to input the password 520, and a Scan button 603b. The user decides the password 520. When the user operates the operating unit 460, inputs the password 520, and then operates the Scan button 603b, the scanner 400 reads an image of the document D0 according to the settings for provisional scans (such as the first data settings 710 shown in FIG. 9), generates provisional scanning data D2, and stores the provisional scanning data D2 in the NVM 203 (storage UM1) of the management server 200 (step 13).

FIG. 6 schematically illustrates the provisional scanning process (an example of a first scanning process) for scanning as shown in FIG. 5. This process is executed repeatedly cooperatively by the scanner 400 and management server 200. Note that arrow 1 indicates returning to step S102 in FIG. 4.

If the ID of an ID card 490 is not input from the ID card reader 480 in FIG. 4, S102, the scanner 400 determines whether or not the provisional scan button 601b of the default screen 601 was operated (S122). If the provisional scan button 601b is not operated, the scanner 400 returns to S102 in FIG. 4.

If the provisional scan button 601b was operated, the scanner 400, together with the management server 200, issues a scan ID 510 identifying the scanning data D2 that is provisionally generated (S124). After issuing the scan ID 510, the scanner 400 displays a password input screen 603 such as shown in FIG. 5 on the display panel 462 (S126). After displaying the password input screen 603, the scanner 400 accepts input of the password 520 (S128). The user, by operating the operating unit 460, can execute the operation of inputting the password 520 to the password input field. When the Scan button 603b of the password input screen 603 is then operated, the scanner 400 reads an image of the document D0 and generates provisional scanning data D2 according to the data settings for provisional scans (the first data settings 710 shown in FIG. 9, for example) (S130). Included in the scanning data D2 are the scanned image, the scanning date/time, how many pages were scanned, and other appropriate information.

After generating the scanning data D2, the scanner 400 sends the scan ID 510 that was output, the password 520 that was input, and the scanning data D2 to the management server 200, requests storing the scanning data D2 (S132), and then returns to S102 in FIG. 4. The management server 200 that receives the request from the scanner 400 then stores the scan ID 510, password 520, and scanning data D2 relationally in NVM 203 (S222), and then waits for a request from a scanner 400 or other device.

As described above, a document D0 can be scanned and the resulting scanning data D2 stored in storage UM1 without user authentication by the scanner 400. Because the storage UM1 is on the management server 200, the data storage capacity required by the scanner 400 is limited.

(5) SCANNING WITHOUT USER AUTHENTICATION

FIG. 7 shows another example of processing scanning data without the second user authentication. In this example, the user requests second user authentication and processing scanning data D2 by the management server 200 from a client 300.

First, the user uses the client 300 to access a web page on the management server 200 that requires a user login (step 21). In this case, the user inputs the user ID and login password to the client 300 by operating the input device 307, and the ID and login password are sent to the management server 200 and used for second user authentication. If user authentication is successful, the user is logged in.

After logging in is completed, the client 300, with the management server 200, displays on the display 306 an unprocessed scanning data selection screen 611 for selecting unprocessed scanning data D2 that is stored in NVM 203 (step 22). The unprocessed scanning data selection screen 611 includes a list of scan IDs 510, and the date/time and number of pages corresponding to each scan ID 510.

When the user operates the input device 307 and selects a scan ID 510 from the unprocessed scanning data selection screen 611, the client 300 displays on the display 306 a password input screen 612 with a password 520 input field corresponding to the selected scan ID 510 (step 23). The password input screen 612 includes an OK button 612b. The password input screen 612 in FIG. 7 shows an example in which the scan ID 0123 was selected as the scan ID of the scanning data D3 to process.

When the user operates the input device 307, inputs the password 520, and then operates the OK button 612b (step 24), the client 300, with the management server 200, displays on the display 306 a job selection screen 613 for selecting a allowable job that is allowed for the authenticated user (step 25).

When the user operates the input device 307 and selects a job from the job selection screen 613, the client 300, with the management server 200, processes the unprocessed scanning data D2 according to the selected job DB3 (step 26).

FIG. 8 shows an example of an authentication data process for the operation illustrated in FIG. 7. This process is executed repeatedly by the client 300 and management server 200. Note that the process of steps S302-S310, S402-S405 is an example of a second process, and the process of steps S406-S410, S312-S314 is an example of a third process.

When the client 300 detects operation of the input device 307 to open a web page from the management server 200, the client 300 starts the operation from S302.

First, the client 300 receives through the input device 307 input of the user ID and login password to the login screen received from the management server 200, and requests authentication of the user corresponding to the input ID (an example of second user authentication) by the management server 200 (S302). The input user ID and password are included in this request.

The management server 200 that receives the request then executes a user authentication process that determines if the user ID and password contained in the request are the ID and password of a user allowed to use the scanning system SY1, and reports the result of this process to the client 300 (S402). If the user ID and password contained in the request are not the ID and password of an allowed user, user authentication fails, the management server 200 does not proceed from S404, and waits for a request from the client 300, for example.

If the user ID and password contained in the request are the ID and password of an allowed user, user authentication is successful, and the client 300 requests the management server 200 for list information for unprocessed scanning data D2 (S304). The management server 200 receiving this request then sends list information for the unprocessed scanning data D2 stored in NVM 203 to the client 300 (S404).

The client 300 receiving the list of unprocessed scanning data D2 then presents an unprocessed scanning data selection screen 611 such as shown in FIG. 7 on the display 306 (S306). For example, based on the list information for the unprocessed scanning data D2, the client 300 displays a list of scan IDs 510, and the scanning date/time and number of pages information corresponding to each scan ID 510.

After displaying the unprocessed scanning data selection screen 611, the client 300 receives an operation selecting a scan ID 510 from the unprocessed scanning data selection screen 611 (S308). Selection of a scan ID 510 can be received by the user operating the input device 307. The unprocessed scanning data selection screen 611 shown in FIG. 7 shows an example of the scan ID 0123 being selected as the scan ID of the scanning data D3 to process.

When a scan ID is selected, the client 300 displays on the display 306 a password input screen 612 such as shown in FIG. 7, and accepts input of the password 520 set for the selected scan ID 510 (S310). The user can input the password 520 to the password input field by operating the input device 307. When the OK button 612b in the password input screen 612 is operated, the client 300 requests the management server 200 for information about the jobs allowed for the user identified by the ID. When the request is received (S405), the management server 200 extracts from the management information DB0 information about the jobs allowed for the user identified by the ID (S406).

By the process of steps S302-S310, S402-S405, scanning data D3 stored in the storage UM1 and selected for processing can be identified triggered by second user authentication by a device other than the scanner 400.

After extracting the jobs, the management server 200 sends information indicating the extracted allowable jobs to the client 300 (S408). The client 300 receiving information identifying the allowable jobs then displays on the display 306 a job selection screen 613 such as shown in FIG. 7 (S312). After displaying the job selection screen 613, the client 300 accepts an operation selecting a allowable job from the job selection screen 613 (S314). The user can perform the operation selecting a allowable job by operating the operating unit 460. Operations configuring data settings, such as setting the color mode, double/single-sided scanning, and the scanning resolution, can be accepted in the process of S314. When a allowable job is selected, the client 300 requests the management server 200 to process the scanning data D3 to process according to the selected job DB3, and then again waits for user input.

The management server 200 that receives the request from the client 300 then processes the target scanning data D3 according to the job DB3 included in the request (S410), and then again waits for a request from a client 300, for example. For example, if a Save to PDF job request is received, the management server 200 converts and saves the scanning data D3 in PDF format (an example of a data format). If a Scan and Mail request is received, the management server 200 converts the scanning data D3 to an e-mail format (an example of a data format), and sends the e-mail to the specified e-mail address.

The management server 200 thus processes the scanning data D3 to process according to the settings corresponding to the user authenticated by the second user authentication. Of course, a process of outputting the scanning data D3 according to the destination related to the user authenticated by user authentication is also executed. A process of converting the scanning data D3 to the output data format included in the settings corresponding to the user authenticated by user authentication is also executed.

When an operation configuring a setting such as the color mode, double/single-sided scanning, or the scanning resolution is received, the management server 200 may convert the scanning data D3 to process according to the data settings as shown in FIG. 9, for example. FIG. 9 shows an example of converting scanning data D3 generated using first data settings 710 to scanning data D4 according to second data settings 720. The first data settings 710 in FIG. 9 show an example of settings with the most advanced functionality, that is, color, duplex (double-sided) scanning at the highest resolution of 600 dpi. Data settings other than the color mode, double/single-sided scanning, or the scanning resolution may also be included in the first data settings 710. In this example, the scanner 400 generates unprocessed scanning data D2 by scanning both sides of the document image in color at the highest resolution of 600 dpi. The client 300 receives input of the second data settings 720 for converting the target scanning data D3 selected from one or more unprocessed scanning data D2.

In the second data settings 720 in FIG. 9, the color mode is set to monochrome, double/single-sided scanning is set to simplex (single-side), and the scanning resolution is set to 200 dpi. The management server 200 then executes a process of converting the target scanning data D3 from color to monochrome, duplex to simplex, and 600 dpi to 200 dpi. The management server 200 thus executes a process of converting target scanning data D3 generated according to first data settings 710 to scanning data D4 based on second data settings 720 according to the second data settings 720 corresponding to the user authenticated by the second user authentication.

As described above, in this example, provisional scanning data D2 can be generated using the scanner 400 even if first user authentication is not possible at the scanner 400, and the scanning data D2 can be processed after the second user authentication on the client 300 side. More specifically, even if the user forgets to take the user ID card to the scanner 400, the document can still be scanned, and the user does not need to keep the document to be scanned until later authentication based on the scan ID and password. As a result, once a document is scanned, the paper document can be destroyed for security, for example. Furthermore, because the scan ID and password are input on the client side, the user does not need to return to the scanner 400 to process the same document. There is also no need to issue a temporary card. The user also does not need to configure the scanning settings even if the allowable jobs are not displayed on the display panel 462 of the scanner 400 because the ID card was forgotten. The user can also cause the scanning system SY1 to execute the desired scanning process after returning to the user's own desk. The scanning system SY1 is therefore convenient.

Furthermore, the scanning system SY1 is also convenient because the document D0 is scanned by the scanner 400 using the relatively advanced first data settings 710, and the resulting scanning data D2 is later converted to the desired second data settings 720.

(6) DATA STRUCTURE OF THE MANAGEMENT INFORMATION DB0

FIG. 10 shows an example of the structure of the management information DB0 for managing jobs permitted for specific users. The management information DB0 is, for example, stored in the NVM 203 (management information storage UM2) of the management server 200. To facilitate managing the individual jobs DB2 related to each user (and user group), jobs are managed in the management information DB0 by job groups DB1 of one or more jobs.

As shown in FIG. 10, one or more of jobs selected from among plural jobs DB2 for processing scanning data D1, D2, are grouped into job groups DB1. For example, the jobs Save to PDF, Save to JPEG, Save to document management server, and Scan and Print are in the job group labelled Planning Group Job. More than one job group DB1 is set in the management information DB0.

One or more scanners selected from the scanners 400 are also related to one or more job groups selected from the job groups DB1. For example, Scanner-1 and Scanner-2 are related to the job group Planning Group Job. Scanner-3 is related to the job group Sales Group Job. Each scanner can also be related to two or more job groups.

One or more users is also related to a single job DB2 in job group DB1. For example, users A and B are related to the Save to PDF job in the Planning Group Job. One or more groups may also be related to a single job DB2 in the job group DB1. For example, user A, group a, and group b are related to the Save to PDF job in the Sales Group Job.

The management server 200 extracts, based on the management information DB0, the jobs users authenticated by the second user authentication are permitted to execute on a scanner 400, and processes the target scanning data D3 according to the extracted settings. For example, if user A performs an authentication scan using Scanner-1, Save to PDF, Save to JPEG, Save to document management server, and Scan and Print in the Planning Group Job related to Scanner-1 are extracted as the jobs permitted for user A. Likewise, if user A performs an authentication scan using Scanner-3, Save to PDF and Scan and Mail in the Sales Group Job related to Scanner-3 are extracted as the jobs permitted for user A. Likewise, if a user in group a performs an authentication scan using Scanner-3, only Save to PDF is extracted as the job permitted for group a.

An advantage of using management information DB0 is that maintaining the management information DB0 is easier when there is a personnel change in an office, for example.

One or more jobs DB2 may also be related directly to scanners 400 as the management information DB0 instead of using job groups DB1. In this case, the four jobs shown in FIG. 10 are related to Scanner-1, the four jobs shown in FIG. 10 are also related to Scanner-2, and one or more users are related to the total eight jobs assigned to the Planning Group. However, if the Planning Group moves and uses Scanner-4 and Scanner-5 not shown in the figures, the eight jobs must be reconfigured for Scanner-4 and Scanner-5.

When job groups DB1 are used in the management information DB0, the Planning Group moves and uses Scanner-4 and Scanner-5, the job group labelled Planning Group Job may be linked to Scanner-4 and Scanner-5. Maintaining the management information is therefore simplified.

(7) OTHER EXAMPLES

The invention is not limited to the foregoing and may be varied in many ways.

For example, the device requiring second user authentication of the user is not limited to the client 300 in FIG. 1, and may be a second scanner different from the scanner that scanned the document. In this case, the second user authentication may be executed by the second scanner together with the management server 200 when triggered by the user swiping the user ID card through the ID card reader of the second scanner. The device requiring second user authentication of the user is not limited to devices not including the scanner that scanned the document, and may be the scanner that scanned the document. For example, the scanner that scanned the document may be configured to execute the second user authentication based on a scan ID and password.

The steps in the processes described above may also be arranged in a different sequence or otherwise changed. For example, in FIG. 6, the process of step S130 generating the provisional scanning data D2 may be executed before S124 or S126.

Instead of the scanning system SY1 issuing a scan ID 510, the process of S124 in FIG. 6 may accept input of the scan ID 510 from the user. If the same scan ID as the scan ID stored in storage UM1 is input, an error may be displayed and the user prompted to input a different scan ID.

If the scan ID 510 is set in S124, the scanning data D3 to process can be identified from the unprocessed scanning data D2 even without the password 520. In this event, S126, S128 may be omitted from the process in FIG. 6, and S310 may be omitted from the process in FIG. 8. This technology also includes embodiments in which the password 520 is not set or input.

The scanning data D1, D2 are not limited to being stored in the management server 200, may be stored by the scanner 400 that scanned the document D0, and may be stored on a storage device connected to the network N1 as the storage UM1. Referring to FIG. 2, for example, the scanning data D1, D2 can be stored in the NVM 403 of the scanner 400. In this case, the NVM 403 is an example of storage UM1. The management information DB0 may also be stored in NVM 403. In this case, the NVM 403 is an example of management information storage UM2. The NVM 403 may also be externally connected to the scanner 400.

FIG. 11 shows an example of a provisional scanning process the scanner 400 executes when the scanner 400 stores the provisional scanning data D2. This process omits S222 in the flow chart in FIG. 6, and replaces S132 with S142.

S122-S130 are the same as described above with reference to FIG. 6. That is, when the provisional scan button 601b on the default screen 601 is operated, a scan ID 510 is issued, input of a password 520 to the password input screen 603 is received, and provisional scanning data D2 is generated from the document D0 (S122-S130). Next, the scanner 400 relationally stores the scan ID 510, password 520, and scanning data D2 in NVM 403 (S142), and then goes to S102 in FIG. 4.

In this way, a document D0 can be scanned without first user authentication by the scanner 400, and the generated scanning data D2 is stored in NVM 403.

FIG. 12 shows an example of an authentication data process executed cooperatively by the management server 200 and client 300 when the scanner 400 stores the provisional scanning data D2. This process replaces S404 in FIG. 8 with S422-S424, and S410 with S426. The remaining steps are the same as in FIG. 8.

More specifically, until the client 300 requests second user authentication, the management server 200 performs the user authentication process, and the client 300 requests list information for the unprocessed scanning data D2 (S302, S402, S304), operation is the same as in FIG. 8. Then, the management server 200 requests list information for the unprocessed scanning data D2 from the scanner 400, and receives list information for the one or more unprocessed scanning data D2 from the scanner 400 (S422). During this time, the scanner 400 that received the request from the management server 200 sends list information for the unprocessed scanning data D2 stored in the NVM 403 to the management server 200. The management server 200 receiving the list information then sends the list information to the client 300 (S424).

Next, the client 300 displays the unprocessed scanning data selection screen 611, receives operation selecting a scan ID 510, receives input of the password 520 through the password input screen 612, and requests the management server 200 for information identifying the allowable jobs permitted for the user corresponding to the ID (S306-S310). The management server 200 receiving the request then extracts from the management information DB0 and sends to the client 300 information identifying the allowable jobs permitted for the user corresponding to the ID (S405-S408).

The client 300 receiving the information indicating the allowable jobs then displays the job selection screen 613, receives operation selecting a allowable job, and requests the management server 200 to process the target scanning data D3 according to the selected job DB3 (S312-S314).

The management server 200 receiving this request the processes, in conjunction with the scanner 400, the target scanning data D3 according to the job DB3 contained in the request (S426). At this time, the scanner 400 may send the target scanning data D3 to the management server 200, and the management server 200 may process the target scanning data D3 according to the allowable job DB3. Of course, the scanner 400 may process the target scanning data D3 according to the job DB3, send the processed scanning data D4 to the management server 200, and the management server 200 may process the scanning data D4 according to the job DB3.

As described above even when the scanner 400 stores the provisional scanning data D2, the scanning data D2 can be processed by receiving second user authentication on the client 300 side. User convenience is therefore improved.

(8) SUMMARY

As described above, the invention provides technology that improves user convenience by many different embodiments. The basic operation and effects described above can also be achieved using only the technology comprising the essential elements described in the independent claims below.

Furthermore, configurations replacing or changing the combination of configurations described in the foregoing embodiments, and configurations replacing or changing the combination of configurations described in the foregoing embodiments or in the related art, are also conceivable. Such configurations are also included in the scope of the invention.

The entire disclosure of Japanese Patent Application No. 2016-215876, filed Nov. 4, 2016 is expressly incorporated by reference herein.

What is claimed is:
1. A scanning system comprising:
a scanner configured to execute a first process of
scanning a document without the scanner executing a first user authentication at the scanner,
generating an identifier for the document,
displaying the identifier at the scanner, and
storing generated scanning data and the identifier relationally in a storage; and
a management device configured to, when a second user authentication is performed by a user input including information related to the identifier at a terminal device, execute
a second process of identifying target scanning data stored in the storage for processing based on the user input including the information related to the identifier, and a third process of identifying one or more settings related to the user authenticated by the second user authentication and processing the target scanning data according to the identified settings.

2. The scanning system described in claim 1, wherein:
the management device has the storage that is used to store the scanning data.

3. The scanning system described in claim 1, wherein:
after the first process of scanning the document, a list of user identifications is presented to the user; and
during the second user authentication, the management device performs the following:
   receiving a user indication that a user identification is selected from the list of user identifications,
   retrieving one or more scanning settings corresponding to the selected user identification,
   retrieving the scanning data, and
   processing the scanning data based on at least one of the scanning settings corresponding to the selected user identification.

4. The scanning system described in claim 3, wherein:
during the second user authentication, the management device further performs the following:
   receiving an indication from a user a password is entered;
   verifying whether the entered password matches a password of the selected user;
   if the entered password matches the password of the selected user, retrieving one or more scanning settings corresponding to the selected user, and
   processing the scanning data based on at least one of the scanning settings corresponding to the selected user.

5. The scanning system described in claim 1, wherein:
during the third process, the management device further performs the following:
   receiving a user indication that at least one of the one or more scanning settings is selected; and
   processing the scanning data according to the selected scanning settings.

6. The scanning system described in claim 1, wherein:
the one or more scanning settings corresponding to the authenticated user includes an output destination of the scanning data, and
the act of processing the scanning data further comprises:
   sending the scanning data to the output destination for the authenticated user to access.

7. The scanning system described in claim 1, wherein:
the one or more scanning settings corresponding to the authenticated user includes an output data format, and
the act of processing the scanning data further comprises:
   converting the scanning data to the output data format.

8. The scanning system described in claim 1, wherein:
the first process of scanning a document further comprises:
   scanning the document under a first set of scanning settings, and
   storing the scanning data generated according to the first set of scanning settings in the storage; and
the third process of processing the scanning data further comprises:
   converting the scanning data generated according to the first set of scanning settings to scanning data according to a second set of scanning settings, the second set of scanning settings being one of the one or more scanning settings corresponding to the authenticated user.

9. The scanning system described in claim 8, wherein:
scanning data generated based on the first set of scanning settings includes more image details than the scanning data generated based on the second set of scanning settings.

10. The scanning system described in claim 1, further comprising:
a management information storage configured to store management information for managing settings allowed for a plurality of authenticated users, the management information including at least information corresponding to one or more job groups, information corresponding to the plurality of authenticated users, and information corresponding to one or more scanners, wherein:
   each of the authenticated users belongs to at least one of the one or more job groups, each of the one or more job groups includes a plurality of scanning settings that are allowed for the corresponding job group and for each of the corresponding scanners; and
   the management device is configured to perform the following:
      receiving information from a scanner when a second user authentication is performed,
      accessing the management information storage to retrieve at least the information corresponding to the scanner, the information corresponding to the authenticated user, the information corresponding to at least one of the job groups that the user belongs to, and at least one of the plurality of scanning settings that are allowed for the corresponding job group and the corresponding scanner; and
      processing the scanning data according to the retrieved at least one of the plurality of scanning settings.

11. A computer-readable, non-transitory recording medium storing a control program of a management device that connects to a scanner configured to generate scanning data by reading a document, the control program of the management device being executed to perform the following:
   receiving from the scanner and storing in storage the generated scanning data when a document is scanned by the scanner without a first user authentication at the scanner,
   generating an identifier for the scanning data,
   causing the identifier to be displayed at the scanner,
   storing the identifier with the scanning data relationally,
   identifying the scanning data that is stored in the storage when a second user authentication is executed by a user input including information related to the identifier at a terminal device, the identifying the scanning data is based on a user input including the information related to the identifier,
   identifying one or more settings related to the user authenticated by the second user authentication, and
   processing the scanning data based on the one or more settings.

12. A scanner that connects to a management device, generates scanning data by scanning a document, processing the scanning data according to settings related to a user, and sending the scanning data to the management device, the scanner executing:
   a process of scanning a document without executing a first user authentication at the scanner, a process of generating an identifier for the document,
a process of displaying the identifier at the scanner, and
a process of storing the generated scanning data and the identifier relationally in a storage at the management device; and when a second user authentication is performed to authenticate a user by a user input including information related to the identifier at a terminal device,
   a process of requesting the scanning data stored at the management device based on the user input including the information related to the identifier,
   a process of identifying one or more settings related to the user authenticated by the second user authentication, and
   a process of processing the scanning data according to the one or more settings.

\* \* \* \* \*